(12) United States Patent
Weihrauch (10) Patent No.: US 9,080,862 B2
(45) Date of Patent: Jul. 14, 2015

(54) DEVICE AND METHOD FOR DETERMINING THE ORIENTATION OF TWO SHAFTS CONNECTED VIA TWO UNIVERSAL JOINTS AND A THIRD SHAFT WITH A PIVOT JOINT

(71) Applicant: Prüftechnik AG, Ismaning (DE)

(72) Inventor: Rainer Weihrauch, München (DE)

(73) Assignee: Prüftechnik AG, Ismaning (DE)

( * ) Notice: Subject to any disclaimer, the term of this patent is extended or adjusted under 35 U.S.C. 154(b) by 203 days.

(21) Appl. No.: 13/669,863

(22) Filed: Nov. 6, 2012

(65) Prior Publication Data

US 2013/0114071 A1 May 9, 2013

Related U.S. Application Data

(60) Provisional application No. 61/557,033, filed on Nov. 8, 2011.

(51) Int. Cl.
*G01B 11/26* (2006.01)
*G01B 11/27* (2006.01)

(52) U.S. Cl.
CPC .............. *G01B 11/27* (2013.01); *G01B 11/272* (2013.01); *G01B 2210/58* (2013.01)

(58) Field of Classification Search
USPC ................ 356/138, 139.05–139.09, 153, 155
See application file for complete search history.

(56) References Cited

U.S. PATENT DOCUMENTS

| | | |
|---|---|---|
| 4,518,855 A | 5/1985 | Malak |
| 4,698,491 A | 10/1987 | Lysen |
| 4,708,485 A | 11/1987 | Illy |
| 4,709,485 A | 12/1987 | Bowman |
| 5,026,998 A | 6/1991 | Hölzl |
| 7,242,465 B2 | 7/2007 | Lacko et al. |
| 7,672,001 B2 | 3/2010 | Hermann |

FOREIGN PATENT DOCUMENTS

DE      101 38 831 A1    2/2003

*Primary Examiner* — Tri T Ton
(74) *Attorney, Agent, or Firm* — Roberts Mlotkowski Safran & Cole, P.C.; David S. Safran (57) ABSTRACT

A device for measuring and optionally correcting the angular offset of two shafts which are connected to one another by way of two universal joints and a third shaft calls for the measurement heads of an optoelectronic alignment device to be adjustably arranged on the shafts by means of at least one pivot joint on one of the clamping devices, with an adjustment capacity. A pertinent method contains matching of the orientation of the measurement heads of the optoelectronic alignment device on the shafts in at least two measurement positions by adjusting the pivot joint.

4 Claims, 6 Drawing Sheets

DEVICE AND METHOD FOR DETERMINING THE ORIENTATION OF TWO SHAFTS CONNECTED VIA TWO UNIVERSAL JOINTS AND A THIRD SHAFT WITH A PIVOT JOINT

CROSS REFERENCE TO RELATED APPLICATION

This application claims the benefit of, and incorporates by reference, U.S. Provisional Patent Application No. 61/557,033, filed on Nov. 8, 2011.

BACKGROUND OF THE INVENTION

1. Field of the Invention

The invention relates to a device and an improved and simplified method for determining and correcting the angular offset of two shafts of machines or machine components which due to their parallel offset are connected to one another by way of two universal joints and a third shaft which connects the two universal joints.

2. Description of Related Art

It is conventional to equalize offsets between two shafts which connect engines and driven assemblies to one another via two universal joints and a third shaft. But this arrangement can only equalize parallel offsets. When the two shafts are not aligned exactly parallel to one another, serious damage often occurs due to an angular offset.

The two types of offsets, specifically parallel offset and angular offset, can be easily and accurately determined with optoelectronic alignment devices. However, this is only possible in the simpler case when the two shafts which are connected to one another coaxially. These optical alignment devices based on lasers or other light sources and photosensitive detectors (PSD, CCD arrays or CMOS arrays) are described in German Patent DE 39 11 307 (which corresponds to U.S. Pat. No. 5,026,998) and German Patent DE 33 20 163 (which corresponds to U.S. Pat. No. 4,698,491). In these documents, alignment devices are described which, on the one hand, contain a light source in a measurement head and a detector in a second measurement head. In the measurement head, both the incidence position and also the incidence direction of a light beam can be measured by there being two detectors which can be read out two-dimensionally in succession in the beam path of the measurement head. This arrangement can be achieved, for example, via a beam splitter. On the other hand, measurement devices are also described in which one measurement head contains both a light source and also a two-dimensional detector, while the second measurement head contains a reflector, for example, in the form of a ridge prism. The alignment devices which are described in the aforementioned documents use light beams of point cross section and detectors which can be read out two-dimensionally.

German Patent Application DE 10 2006 023 926 and corresponding U.S. Pat. No. 7,672,001 describe alignment devices in which light beams are fanned out in more than one direction transversely to the propagation direction. Some embodiments call for each measurement head to contain both a light source and also a detector. The aforementioned optical alignment devices assume that the points of impact of the light beam or light beams on the detector or detectors is measured in several (at least three, but usually four or even five or more) rotary positions of the two shafts.

German Patent DE 33 35 336 and corresponding U.S. Pat. No. 4,518,855 describe an alignment device in which each measurement head contains both a light source and also detectors which can be read out two-dimensionally according to the site of incidence and angle of incidence. This measurement device is able to determine a misalignment according to angular and parallel offset in only one rotary position of the two shafts from one measurement of the points of impact on the detectors when the orientation of this rotary position and the points of impact are known for well aligned shafts by a comparison measurement on a single straight shaft. Measurements in different angular positions on the shafts which are to be aligned are, however, also fundamentally possible.

Often, special matching devices are employed for the use of these optoelectronic alignment devices for shafts which do not run coaxially, which therefore have a parallel offset and are connected via two universal joints and a third shaft. This device is shown in European Patent EP 1 430 995 and corresponding U.S. Pat. No. 7,242,465. The disadvantage in the use of these devices is that, as described in these documents, often the third shaft must be removed. Moreover, complicated handling of the devices and execution of a host of steps are necessary which make the performance of the determination of an angular offset complex and susceptible to errors. Thus, it can happen that a machine, once it has been correctly aligned, is unintentionally shifted when the third shaft is re-installed. Another problem is that these devices are produced with overly large tolerances so that the measurement of the angular offset becomes too inexact due to play. The prior art in this document involves a pivot joint which has to be positioned along a blade. This blade is mounted to one of the two shafts, and the pivot joint with the sensor head on it is arranged in a position where the axis of the pivot joint matches the axis of the other shaft to be aligned. The position of the axis of this pivot joint must be adapted to the radial distance between the two shafts which are to be brought into alignment.

U.S. Pat. No. 4,708,485 describes a rotatable holder for the measurement head of an alignment instrument. This rotatable holder is mounted to the housing of a machine component whose shaft is to be brought into alignment with the shaft of another machine component. The axis of this rotatable holder is positioned coaxially with the machine housing. As this housing of the machine component is not necessarily positioned coaxially with the shaft in this housing, the shaft position has to be monitored with additional sensors.

SUMMARY OF THE INVENTION

Therefore, a primary object of the present invention is to devise a device which enables omission of the dismounting of the connecting third shaft and requires only little modification of the conventional optoelectronic alignment devices.

Another object is to devise a method for determining the angular offset of two shafts connected via two universal joints and a third shaft using an optical alignment device which enables high precision in the determination of the angular offset with any angular positions of the two shafts being possible.

These objects are achieved by a carrier for the measurement heads of an optoelectronic alignment device that is comprised of a holding device and of a clamping device for attaching the carrier to a shaft. This holding device is used to accommodate the measurement heads of the optoelectronic alignment devices described in the prior art. The carrier has a pivot joint which is located securely on the clamping device and whose axis of rotation runs parallel to the shaft axis. The holding device for the measurement head is located on the rotary part of the pivot joint.

These objects are further achieved by a measurement method for the angular offset using an optoelectronic alignment device with the above described carrier, and having the following steps:

a) mounting two measurement heads on at least one carrier in accordance with the invention, and optionally, a conventional carrier on the two shafts, determining the orientation of the measurement heads as a rotary position relative to the axis of the pertinent shaft and positioning of the two measurement heads by shifting the at least one carrier along the holding device and pivoting of the pivot joint so that the light beam or beams strike the detector or detectors, b) measuring the point or points of impact on the detector or detectors with an optical alignment device in the first measurement position, c) turning the shafts or the components of the alignment device around the shafts into a second measurement position, realignment of the pivot joint and radial shifting of the measurement head of the alignment device on the holding device, d) measuring the points of impact of the light beam or beams on the detector/detectors, measurement of the rotary position of the pivot joint and computation of the angular offset in the second measurement position from these measurement results, e) repeating steps c) and d) for measurement in a third and possibly additional measurement positions, if desired, f) determining the angle between the two axes from the results of steps b), d) and e) if this step has been carried out, and optionally, correcting of the angular alignment by changing the position of the movable machine or machine component.

Other details, aspects and advantages can be taken from the following description of the invention using the figures.

DETAILED DESCRIPTION OF THE INVENTION

FIGS. 1 to 4 show a first machine or machine component 30 with a shaft 34 on a first base 32 and a second machine or machine component 31 with a shaft 35 on a second base 33. The shafts 34, 35 of these two machines 30, 32 are essentially parallel in the orientation of their axes, but in at least one of the two directions of space the shafts are offset relative to one another in a direction perpendicular to the longitudinal axis of the two shafts 34, 35. Therefore, there is a universal joint 36, 37 on the end of each of the shafts 34, 35. These two universal joints 36, 37 are connected to one another by a third shaft 38.

It is generally known that, for correct operation of a unit of three shafts 34, 35 which are connected to two universal joints 36, 37, the following two conditions must be satisfied: first, the two forks of the universal joints be located on the third shaft 38 in a single plane, and second, the angles on the two universal joints 36, 37 be identical. Occasionally, authors specify as a third condition that all three shafts 34, 35, 38 be located in a single plane. However, this third prerequisite is a necessary consequence of the two first named conditions.

For better understanding, at this point, the devices, called carriers, are described. The carriers connect the measurement heads 40, 41 of the optoelectronic alignment devices which have been described in the prior art to the shafts 34, 35 which are to be aligned relative to one another. The carriers ordinarily have a clamping device 47, 48 which provides for a fixed and rigid connection of the measurement head to the shaft 34, 35. These clamping devices contain a body for placing against the jacket surface of a cylindrical shaft. This body is often a block with a prismatic recess. Such a block with a prismatic recess can be easily mounted on shafts of different diameters so that the apex line of the prismatic recess runs exactly parallel to the shaft axis. The fixed connection of the body to the shaft is produced by locking the block with the prismatic recess on the shaft. This locking takes place via leaf springs or clamps which surround the shaft and are conventionally secured with clamping or tightening screws. Holding devices in the form of rods or pipes 45, 46 are mounted parallel to a direction which runs radially relative to the shafts on the blocks of these clamping devices. The housings of the measurement heads 40, 41, then, have corresponding holes in which these rods run. The measurement heads 40, 41 are, then, fixed on these rods or pipes 45, 46 with clamping devices, for example, tightening screws or quick-acting closures. This arrangement of the measurement heads 40, 41 on rods 45, 46 makes it possible to mount the measurement heads at different distances from the shaft axis. Thus, the light beam cannot be blocked by a clutch which connects the two shafts. Therefore, the carrier for a measurement head comprise the clamping device for attachment to the shaft and a holding device for the measurement head, for example, rods, pipes, or the plates of German Patent DE 33 35 336 and corresponding U.S. Pat. No. 4,518,855. The body or block of the clamping device provides for a stable connection between the shaft, on which it is clamped for example, with a chain, and the holding devices, therefore rods, pipes 45, 46 or alternatively the plates of German Patent DE 33 35 336 and corresponding U.S. Pat. No. 4,518,855.

Figure 1A:
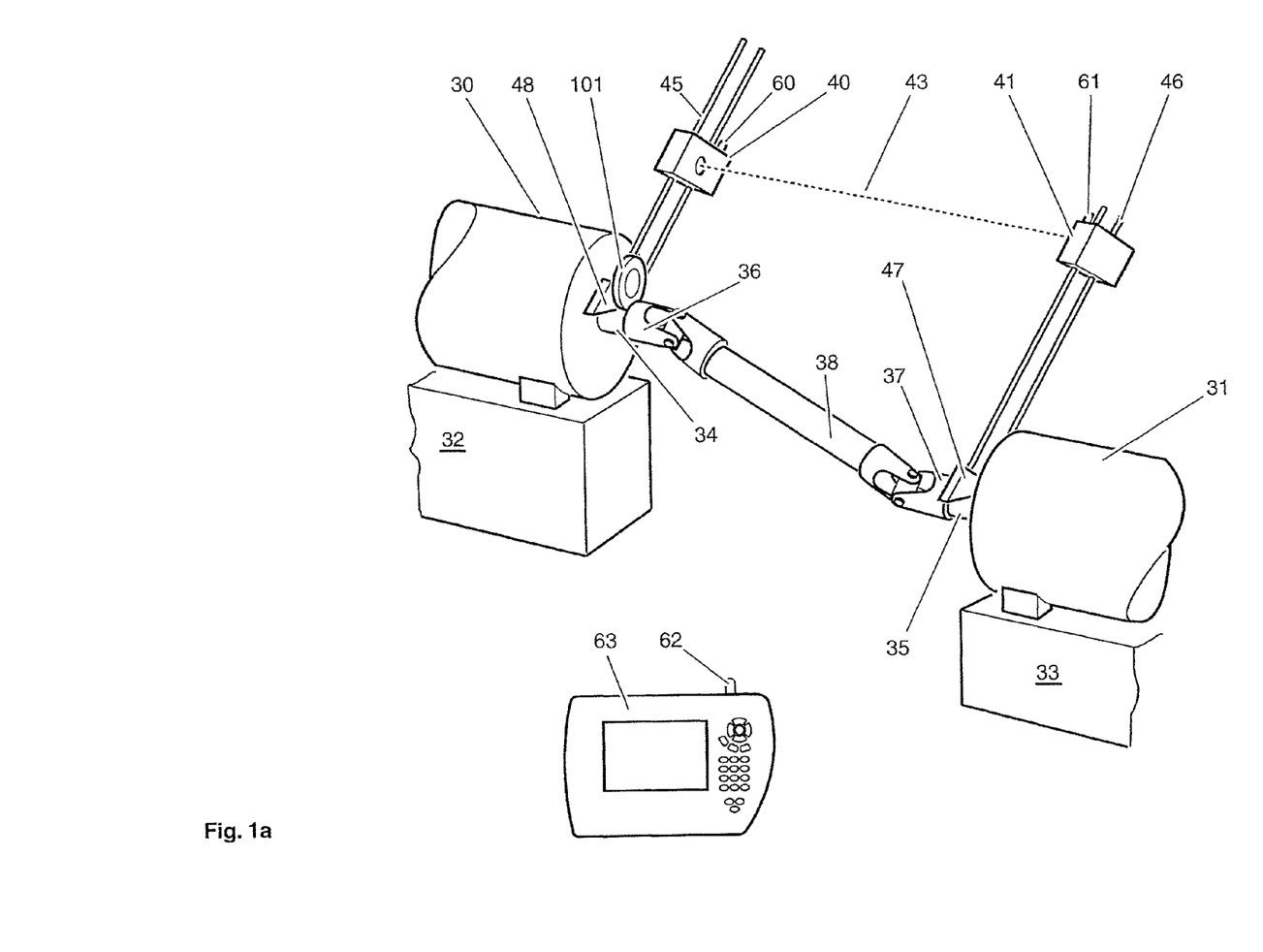
FIG. 1a a perspective view of the device with two shafts and the connecting shaft with the two universal joints, and a schematic depiction of the alignment method with the optical alignment device.
Figure 1B:
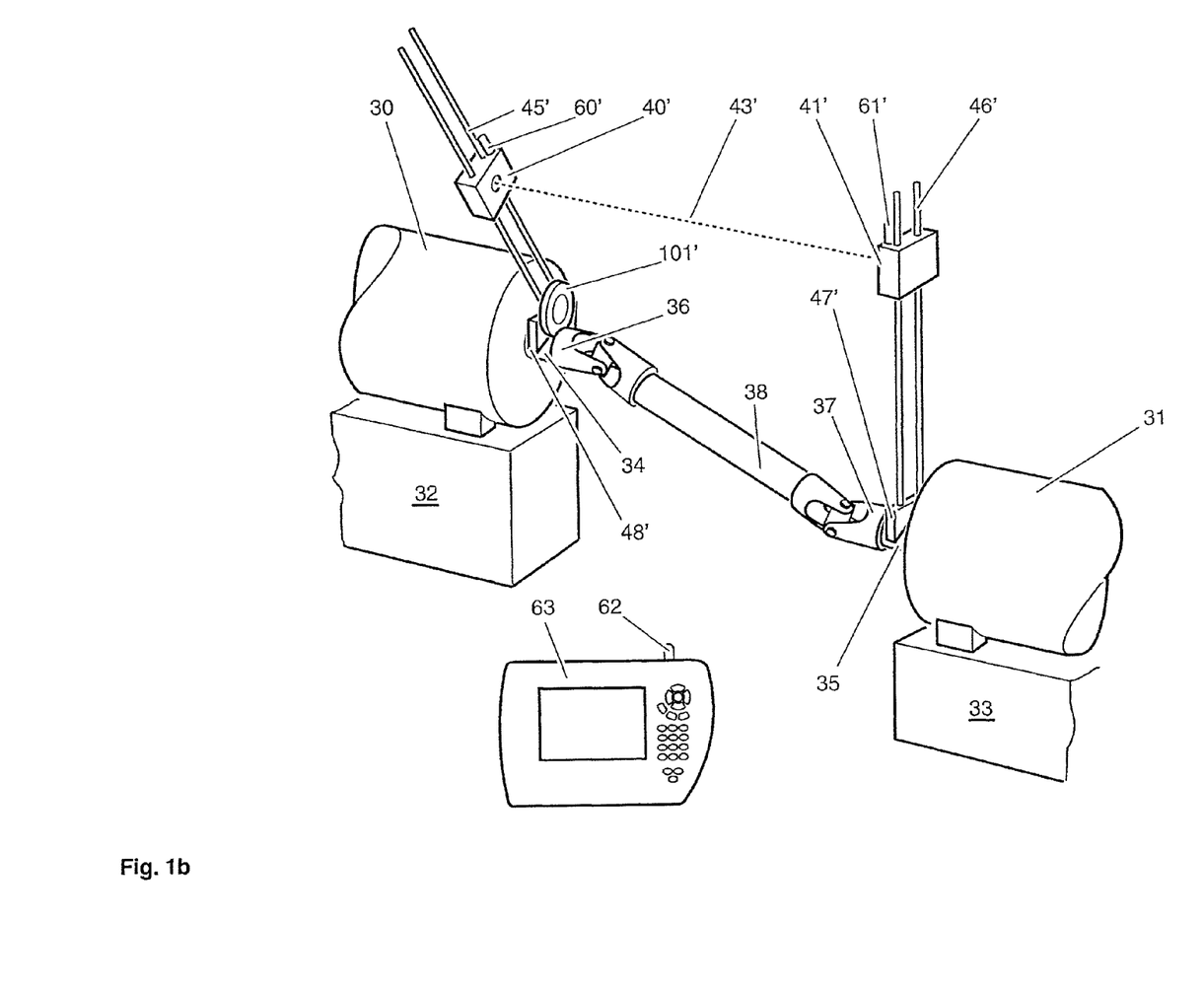
FIG. 1b shows the device of FIG. 1a in a second position.

FIGS. 1a & 1b contain perspective views of two machine components 30, 31 with shafts 34, 35 which are arranged with a parallel offset, the two universal joints 36, 37, the third shaft 38 which connects the two universal joints, the clamping devices 47, 48, the rods 45, 46, the measurement heads 40, 41 with antennas 60, 61 and the light beam 43 emitted from one of the two measurement heads. The electronics of the measurement heads communicates wirelessly via the antennas 60, 61 with the computer 63 which, likewise, has an antenna 62. In FIG. 1a, clamping devices, carriers and measurement heads are located roughly in the plane which has been formed from the two shafts. In FIG. 1b, the two carriers are shown in the position vertically up. The reference numbers of the corresponding components of the optoelectronic alignment device in these positions which have been changed relative to the two shafts have been provided with an apostrophe. It is not difficult to recognize at this point that the pivot joint 101' must be adjusted so that the light beam 43' which runs parallel to the respective shaft, due to the orientation of the measurement head, strikes the other measurement head.

Figure 2:
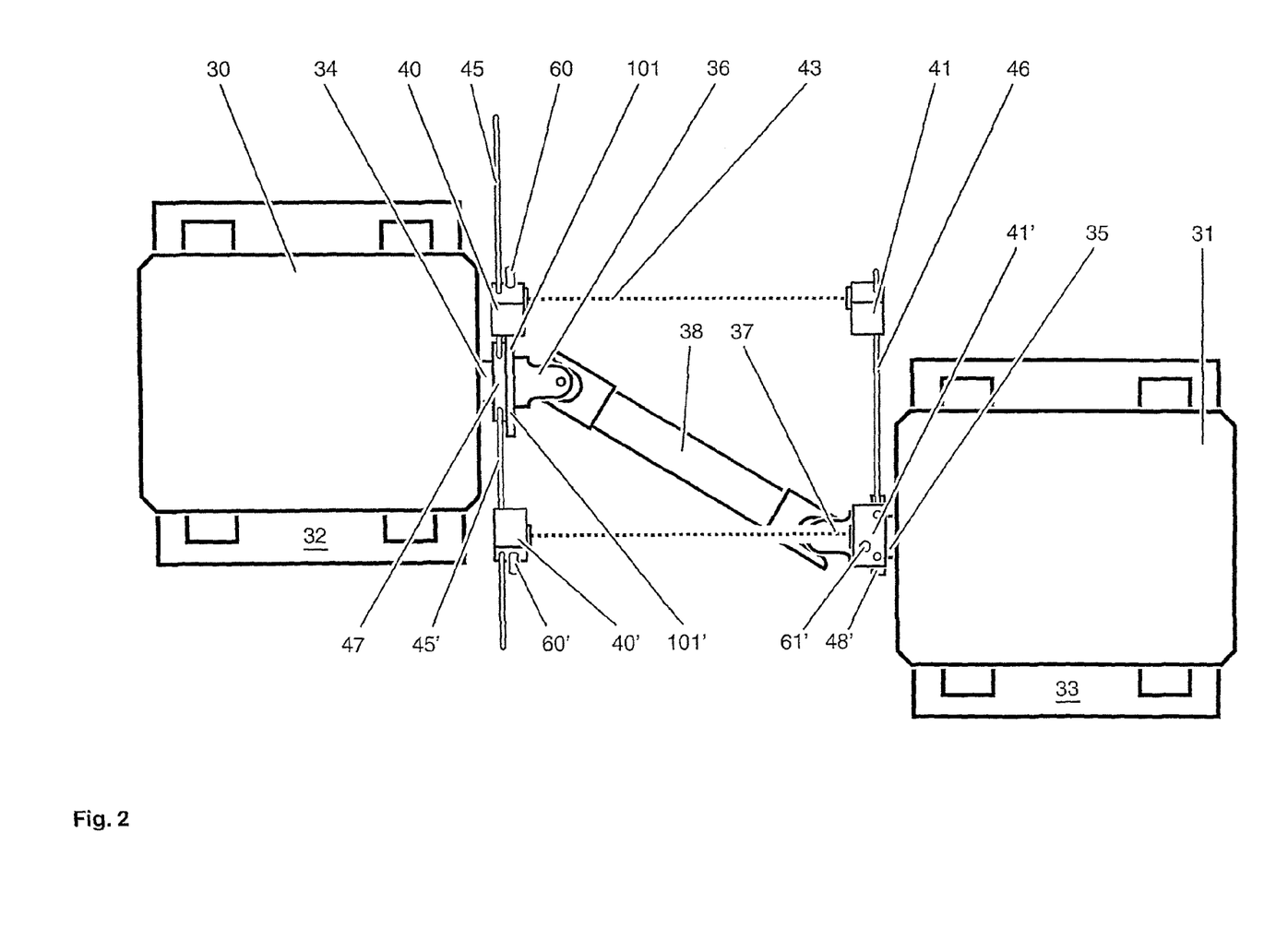
FIG. 2 is a plan view of the geometrical conditions viewed vertically perpendicular to the axes of the two machine components.

FIG. 2 contains a plan view of the arrangement of FIGS. 1a, 1b, with the measurement heads being shown in the two positions 40, 41, of FIG. 1a, and 40', 41' of FIG. 1b. The positions designated by an apostrophe, e.g., 40', 41', being vertically oriented.

Figure 3:
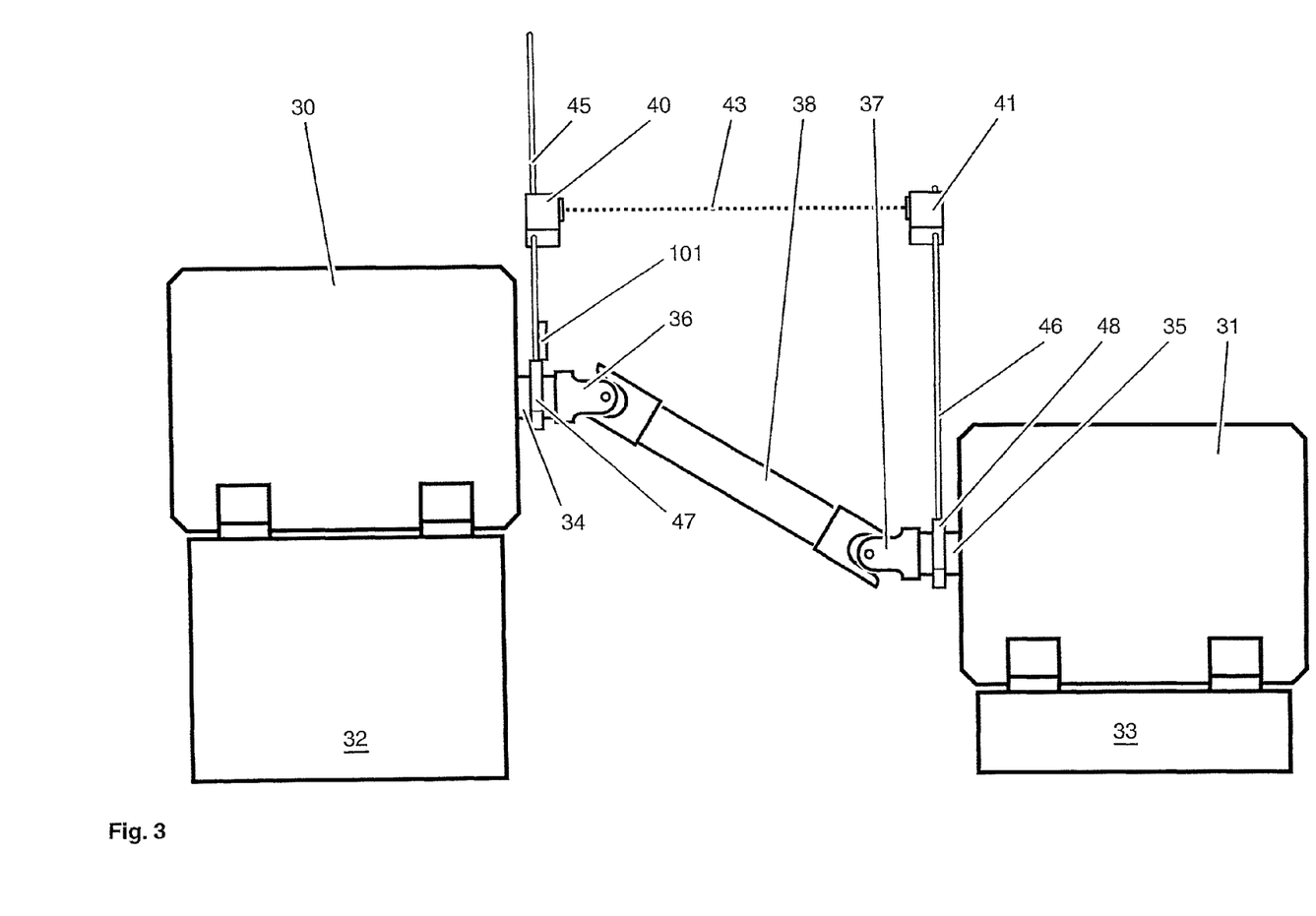
FIG. 3 is a side view of the geometrical conditions viewed horizontally perpendicular to the axes of the two machine components.

FIG. 3 is a side view with the arrangement of the measurement heads roughly in a plane containing both the shafts 34, 35.

Figure 4A:
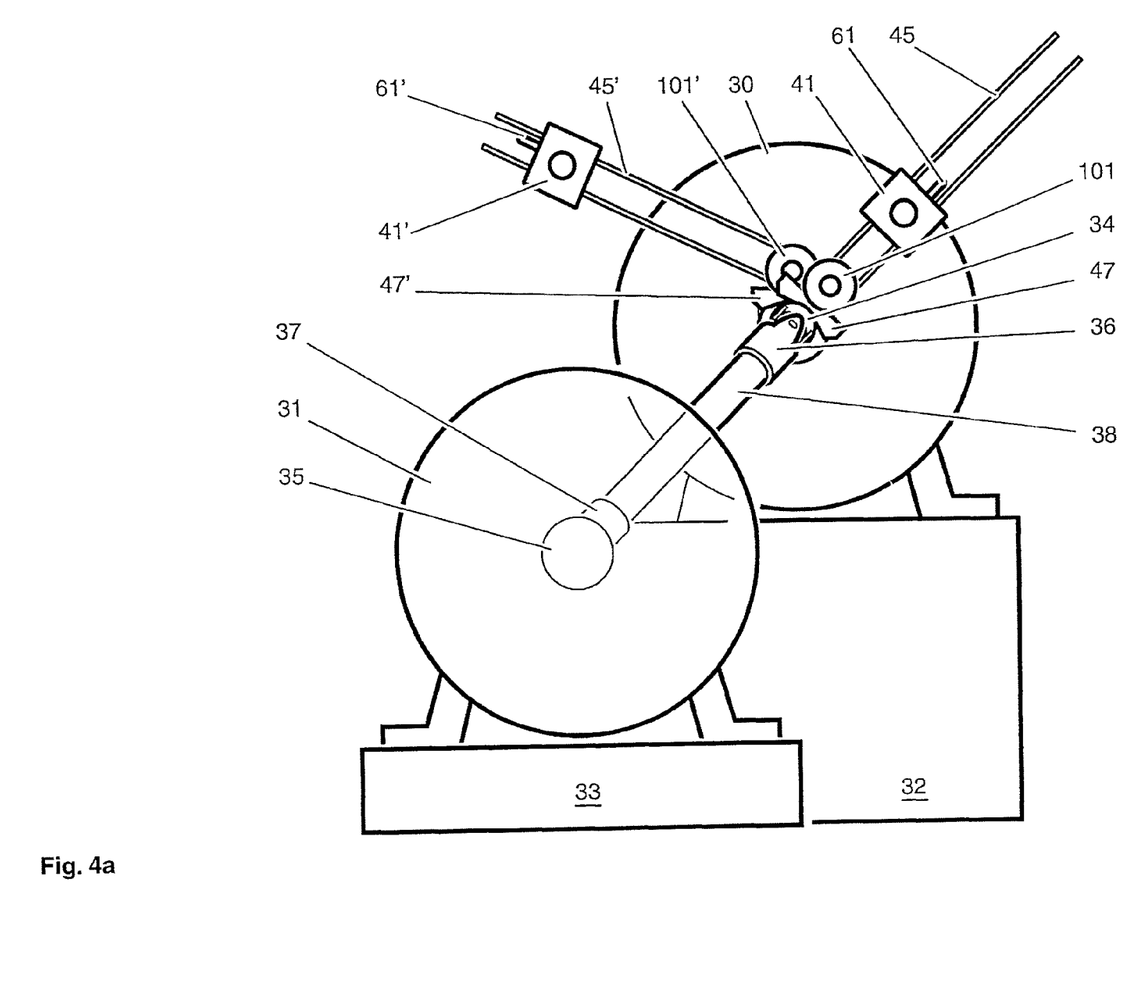
FIGS. 4a & 4b are end views of the arrangement in two different positions.
Figure 4B:
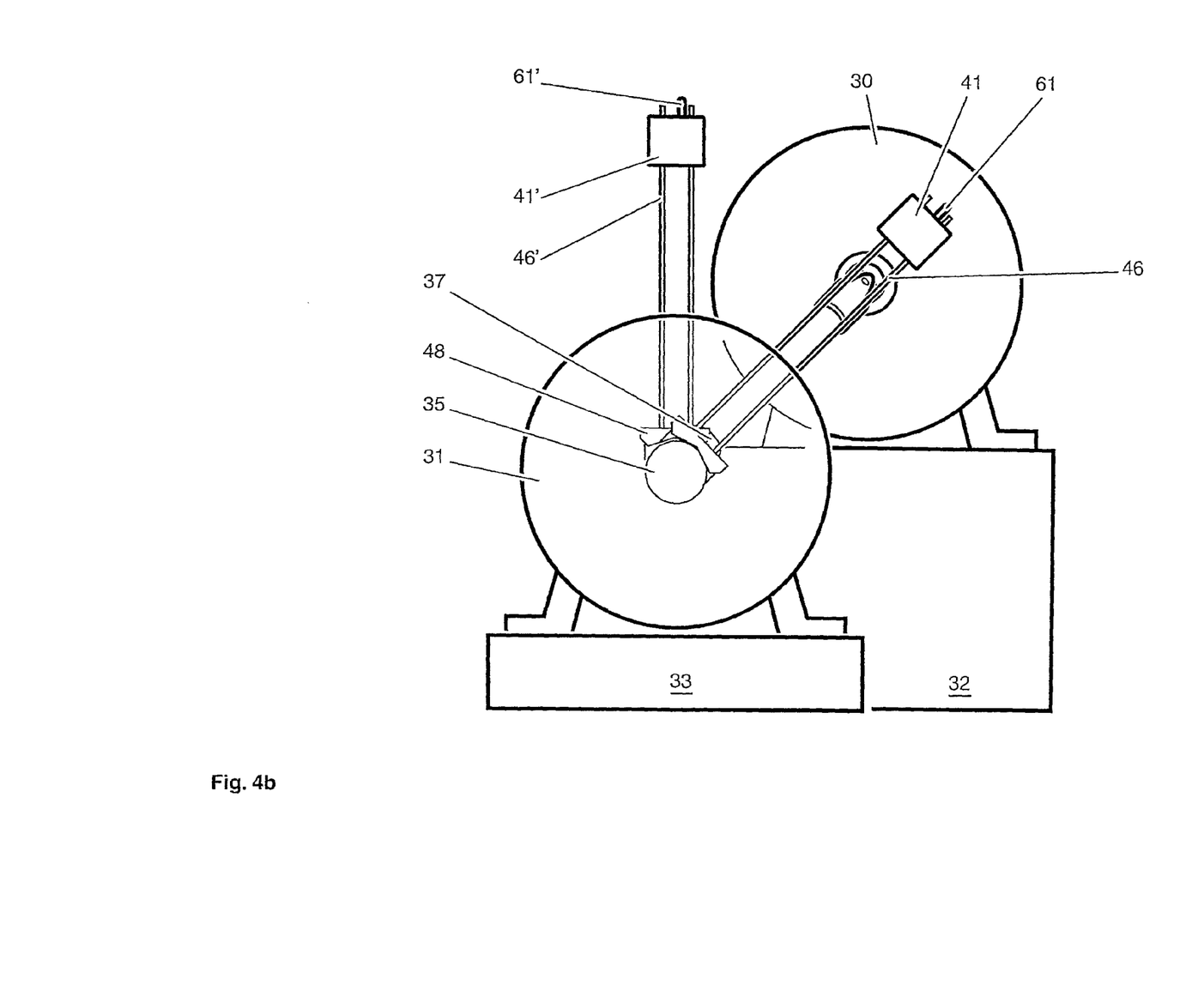

The FIGS. 4*a*, 4*b* contain representations of the arrangement viewed along the two shafts. Here, FIG. 4*a* shows only the part of the optoelectronic measurement device attached to the shaft 34 of the machine component 30 in the two positions 40, 40', while FIG. 4*b* shows the part of the optoelectronic measurement device attached to the shaft 35 of the machine component 31 in the two positions 41, 41'.

When measuring two shafts which are connected only via one clutch, therefore when measuring essentially coaxial shafts, it is easily possible to approach several optional angular positions of the two shafts which are connected to one another to turn jointly. Once the two measurement heads are aligned with one another, the light beam will strike the detector even in other angular positions. Corrections are only necessary for very serious misalignments.

However, when the angular offset of the two shafts 34, 35 which are connected to one another via two universal joints 36, 37 and a third shaft 38 is to be measured, it is shown that, when the measurement heads with the shafts connected to one another turn and/or when the measurement heads turn around the shafts, the light beam generally misses the detector at a far distance. This is a result of the parallel offset of the two shafts which only does not occur when the two measurement heads are located in the plane which has been formed from the three shafts, therefore in two measurement positions which are offset by 180° in this plane.

Due to geometrical circumstances, it is not always possible to approach these two measurement positions because, for example, because achieving these positions is prevented by other machine parts. In order to enable a measurement in any measurement positions, in accordance with the invention, at least one of the two carriers for the measurement heads is equipped with a pivot joint 101. This pivot joint 101 is usefully mounted on the body of one of the clamping devices for placement on the shaft at a distance as small as possible from the shaft, i.e. at a fixed distance from the shaft surface. It is arranged such that its axis of rotation of the joint runs parallel to the shaft axis. Thus, it becomes possible for the light beam or beams 43 of the alignment device to hit the detector or detectors even if the two measurement heads 40, 41 on the holding devices 45, 46 are not located in the plane which has been formed from the three shafts 34, 35, 38. For holding devices which allow only a radial adjustment of the measurement head 40 or 41 which is attached to them, only mounting of the measurement head in the plane of the three shafts is possible. Conversely, the rotary adjustment of the holding device 45, advantageously, enables a light beam 43 which is emitted from one of the two measurement heads to be received by the other measurement head even if joint rotation of the three shafts 34, 35, 38 or movement of the clamping devices has taken place such that the measurement heads are no longer located in the plane of the three shafts for holding devices which run in a straight line.

Therefore, on the one hand, the figures show a measurement position in which the measurement heads are located in the plane of the three shafts. The rods of the holding device which are used here run in the radial direction to the shaft. Furthermore the carriers are shown in a second measurement position in which it is necessary to change the setting of the pivot joint away from the radial direction so that the light beam can hit the pertinent detector. In the second measurement position the reference numbers of the components of the alignment device are identified with an apostrophe.

Thus, impact points of the light beam can be recorded in several measurement positions, and each time, in addition to a shifting of the measurement heads, the position of the pivot joint can also be changed. Here, the angular orientation of the measurement head relative to the axis of the shaft on which it is mounted can be recorded, for example, with an inclinometer which is mounted in or on the measurement head. Alternatively, the following can also be recorded: 1. the angular orientations of the measurement head, 2. the angular orientations of the body connected to the shaft and the shaft itself, 3. the angular orientation of the body connected to the shafts and the position of the pivot joint, or 4. the angular orientation of the shafts themselves and the position of the pivot joint.

The measurement method with the device in accordance with the invention is therefore undertaken in the steps which were briefly described above and which will now be explained in detail.

a) Mounting two measurement heads on at least one device in accordance with the invention, and optionally, a conventional device on the two shafts, determination of the orientation of the measurement heads as a rotary position relative to the axis of the pertinent shaft and positioning of the two measurement heads by shifting along the holding device and alignment of the pivot joint so that the light beam or beams hit the detector or detectors.

A clamping device with a measurement head 40 of an alignment device is located on the shaft 36. The measurement head 40 sends a light beam 43 in the direction to the second machine or machine component 31. The first measurement position, in principle, can be chosen arbitrarily and restrictions by other machine parts can be taken into account.

In order to determine the orientation of the measurement heads as a rotary position relative to the axis of the pertinent shaft or the carrier with the clamping devices, ane inclinometer located in or on a measurement head can be used. A compass, especially a gyrocompass, or a gyroscope can also be used. The use of a gyroscope is especially advantageous when the shafts do not run horizontally. A zero position on the pivot joint 101 in which the direction of displacement of the measurement head on the holding device runs in a straight line and radially to the shaft is advantageously identified for the user by a marking or a catch position on the pivot joint. This easily recognizable zero position enables the use of a device in accordance with the invention even on shafts which are not arranged with a parallel offset without further modifications being necessary, by approaching this zero position. Fundamentally, however, it is also possible to use an additional inclinometer or compass or gyroscope on the clamping device or on the part of the pivot joint which is securely connected to the clamping device.

In order to be able to electronically determine the orientation of a carrier in accordance with the invention, there can be an inclinometer or a gyroscope on the carrier itself. Alternatively, in a rotary device in accordance with the invention, an inclinometer present in the measurement head can be used, and the rotary position of the pivot joint 101 can be additionally detected, for example, using an electronic angle transducer. With conventional carriers, an inclinometer in the measurement head is also helpful to determine the relative orientations of the two carriers. It is useful to transmit the orientations of the carriers and measurement heads and the position of the pivot joint to a computer 63 that is used for alignment and to display them on the display. Here, it can also be shown whether the orientations of the two carriers are within a tolerance which can be established. The angle values can be transmitted from the carrier or measurement head to the computer over connecting cables or wirelessly, and for illustration of the wireless transmission, antennas 60, 61 are shown on the measurement heads 40, 41 and antenna 62 is shown on the computer 63 in FIGS. 1a, 1b.

When the displacement direction of the measurement head along the holding device does not run in the plane of the three shafts, it is now possible to adjust not only the radial position of the measurement heads, but also to adjust the pivot joint to such an extent that a light beam emitted from one of the measurement heads can be recorded by the other measurement head.

It is not absolutely necessary for the measurement that carriers and rods be oriented in the same orientation relative to their respective shaft, simply the orientation of the measurement head with respect to the axis of rotation of the respective shaft need be determined. This can be done, on the one hand, in the measurement head itself with an inclinometer located there, but also by the combination of an inclinometer in the carrier and an angle transducer for the rotary position of a pivot joint which is optionally present or by the combination of angle transducers for the positions of the pivot joint and shaft. The knowledge of this orientation is necessary for the conversion of the coordinates of the measurement head into the coordinate system of the machine.

b) Measuring the impact position of the light beam or beams in the first measurement position.

If a light beam which has been emitted from one measurement head can be recorded by the other measurement head, the position of the impact point of the light beam or of the impact points of the light beams on the detector or detectors is measured. The orientation of the measurement heads with reference to the respective shaft can also be recorded again. These values are acquired in the computer which is used for determination of the alignment, as described under a).

c) Approaching a second measurement position.

For this purpose, the three shafts are jointly turned a distance or the two clamping devices are each pushed by a certain angle around the shafts. Here, it must be watched that the two measurement positions have a distance as great as possible from one another. The determination of the angle between the two shafts becomes more accurate, the greater the distance of the two measurement positions from one another. If the two shafts are turned so far that the carriers are turned from "12 o'clock" to "2 o'clock" or "10 o'clock, therefore by 60°, the accuracy of determining the angular offset is good. In turning to "1 o'clock" or "11 o'clock", therefore by 30°, sufficient accuracy can be assumed. When the shafts however are turned only by one or two "minutes", therefore by 6° or 12°, normally the required accuracy of the determination of the angular offset is not achieved.

d) Measuring the impact position of the light beam or beams in the second measurement position.

Then, the two measurement heads 40, 41 are in a position in which not only a displacement of the measurement heads 40, 41 radially relative to the shafts 34, 35 is necessary so that the light beam or beams again hit the detector or detectors. In addition, adjustment of the pivot joint 101 is necessary which makes it possible for a light beam emitted from one measurement head to be recorded by the other measurement head. At this point, the orientations of the measurement heads can be recorded with reference to the respective shaft and transmitted to the computers used for alignment, as described under a). After a radial displacement of the measurement head/heads and an adjustment of the pivot joint, the position of the impact point of the light beam or the impact points of the light beams on the detector or detectors can also be determined again.

e) Optionally, repeating steps c) and d) for measurement in a third and possibly other measurement positions. If three or more measurement points are used to determine the angular offset, the accuracy of the measurement can be further increased by the average values being formed by way of the individual measurement values. Even if this step e) is carried out one or more times, the accuracy is still especially high when the individual measurement positions are as far as possible from one another and are distributed over an angular range as large as possible relative to the shaft axis.

f) Computing the angular offset between the shafts 34, 35, and optional correction. In the initially mentioned prior art, it is described how a determination of the angular offset is possible when the measurement heads are mounted in several different rotary positions of the shafts which are connected to one another. In order to determine the angular offset in the plane of the three shafts 34, 35, 38, the coordinates of the impact point or points of the light beam or beams in a direction perpendicular to the propagation direction of the light beams and in one direction which is radial to the respective shaft are used. In order to determine the angular offset in the direction perpendicular to the plane of the three shafts 34, 35, 38, the coordinates of the impact point or points of the light beam or beams in a direction perpendicular to the propagation direction of the light beams and perpendicular to a direction which is radial to the respective shaft are used. In a first step, the coordinates of the impact points using the likewise determined angular orientation of the measurement head relative to the respective shaft are transformed into the coordinate system of the machine for the respective shaft; this normally takes place by simple rotation of the coordinate system by the respective angle. Accordingly, the differences of the coordinates between two measurement positions in the machine system are determined. Then, with consideration of the angle of rotation between these measurement positions and the distance between the measurement heads, the angular offset between the two shafts 34, 35 is computed from these differences. The distance between the measurement heads can be determined, for example, with a tape measure.

The conversion from the coordinate systems of the measurement heads into the coordinate system of the machine components takes place using the rotary positions of the measurement heads relative to the respective shafts or the rotary positions of the shafts and the orientation(s) of the pivot joint(s) which were determined by means of inclinometer, the compass or gyroscopes. With the angular offsets which are obtained in this way, at this point, the position of the machine which is to be moved can now, optionally, be corrected by displacement and using shims so that the two shafts 34, 35 are aligned parallel. Here, "optionally corrected" means correction when the angular offsets which are measured in the two dimensions exceed stipulated tolerances. In an optionally necessary correction, the distances between the measurement heads and the bases of the movable machines must be considered to compute the required movements (for example, by placing so-called shims underneath or removing them or by lateral displacement). This is possible based on simple geometrical considerations. This computation of the required correction values for the respective machine bases is done in the measurement head/heads themselves, a computer which belongs to the measurement device, or another computer to which the measured values of the detectors in the measurement heads are transmitted. This computer, which can be located in the measurement heads themselves, receives the measured values of the detectors normally over a wire line. In particular, for computers which are not located in the measurement heads, the transmission of the measured values from the detection electronics in the measurement heads can take place wirelessly. When the measurement heads remain in the last measurement, the effect of a correction on the machine bases can be observed directly on the display of the computer. This means that the measured value of the impact point on the detector is continuously electronically detected. Immediately after the detection or during the continuing detection, the angular offset is then computed. With the result of the angular offset then new setpoints for movement of the machine bases are determined and displayed on the computer display. Thus, it is possible to track the success of a measure, such as placing shims or lateral displacement directly in the display.

Few simple steps are therefore sufficient to determine the angular offset with high precision. The determination of the angular offset is, in principle, possible with each of the indicated alignment devices from the aforementioned prior art. Here, it should simply be watched that the measurement devices are made such that the holding devices which connect the measurement heads to the shafts are made such that a change of the position of the measurement heads in the radial direction relative to the shaft is possible and that the pivot joint in accordance with the invention is located on the carrier.

In the aforementioned description, the method in accordance with the invention is described with the installed third shaft which connects the two shafts which are to be aligned. This is the operating state. It goes without saying that the method can be used in just this way when the third shaft has been dismounted for maintenance purposes. Here it should simply be watched that when all steps of the method are carried out, the relative angular position of the two shafts corresponds to that of the operating state.

What is claimed is:

1. Carrier for a measurement head of an optoelectronic alignment device for use in the measurement of the relative alignment of two shafts, which is used to mount a measurement head on one of the two shafts, comprising:

a body adapted for placement against a cylindrical surface of one of the shafts, a clamping device for attachment of the body on the shaft, a holding device for accommodating a measurement head so that the measurement head can be displaced in a direction along the length of the holding device, a rotation device which is permanently connected to the body, a rotary part of the rotation device having a pivot joint connected to the holding device and about which the holding device is pivotable, the pivot joint having an axis of rotation running coaxially or parallel to the shaft, wherein the direction in which the measurement head can be displaced along the length of the holding device is radial relative to the axis of rotation of the pivot joint.

2. Carrier in accordance with claim 1, further comprising at least one of an inclinometer, a compass and a gyroscope on the body.

3. Carrier in accordance with claim 1, wherein the rotation device is permanently connected to the body at a fixed distance from a surface of the body which is placed against the cylindrical surface of one of the shafts.

4. Measurement system for measurement of the relative alignment of two shafts, comprising:

first and second carriers for at least one measurement head, said each of said carriers having a body adapted for placement against a cylindrical surface of one of the shafts, a clamping device for attachment of the body on the shaft, a holding device for accommodating a measurement head so that the measurement head can be displaced in a direction along the length of the holding device, a rotation device which is permanently connected to the body, a rotary part of the rotation device having a pivot joint connected to the holding device and about which the holding device is pivotable, the pivot joint having an axis of rotation running coaxially or parallel to the shaft, and in which the direction in which the measurement head can be displaced along the length of the holding device is radial relative to the axis of rotation of the pivot joint, and at least one measurement head containing a light source and at least one measurement head containing a location-resolving detector which is sensitive to light emitted from the light source with at least one of an inclinometer, compass and gyroscope on or in at least one of the measurement heads.

* * * * *